(12) United States Patent
Santos et al.

(10) Patent No.: US 7,142,420 B2
(45) Date of Patent: Nov. 28, 2006

(54) DEVICES AND METHODS FOR CONTROLLING RELATIVE MOVEMENT BETWEEN LAYERS OF AN ELECTRONIC DEVICE

(75) Inventors: Theodore R. Santos, Boulder, CO (US); Andrew G. Lejman, Lafayette, CO (US); Jeffrey Swanson, Erie, CO (US); David Larson, Boulder, CO (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 10/945,576

(22) Filed: Sep. 20, 2004

(65) Prior Publication Data

US 2006/0061943 A1 Mar. 23, 2006

(51) Int. Cl.
G06F 1/16 (2006.01)
G09G 5/00 (2006.01)
(52) U.S. Cl. .................. 361/686; 345/169; 257/207
(58) Field of Classification Search ............... 345/169, 345/905; 257/207; 361/697, 690–695, 679–687, 361/724–727
See application file for complete search history.

(56) References Cited

U.S. PATENT DOCUMENTS

2002/0125504 A1 * 9/2002 Perlov et al. ............... 257/207
2005/0104857 A1 * 5/2005 Jacobs et al. ............... 345/169

FOREIGN PATENT DOCUMENTS

| DE | 203 17 865 U1 | 4/2004 |
| EP | 0 618 715 A1 | 10/1994 |
| EP | 0 927 924 A1 | 7/1999 |

* cited by examiner

Primary Examiner—Hung Van Duong
(74) Attorney, Agent, or Firm—Philip R. Wadsworth; Sandip (Micky) S. Minhas; Dang M. Vo

(57) ABSTRACT

The disclosed embodiments provide devices and methods for movably connecting module layers of an electronic device to discretely actuate a first predetermined operational mode while locking out other predetermined operational modes. In one embodiment, for example, an electronic device includes a first module layer movable in a first direction and a second module layer movably connected relative to the first module layer. Further, a third module layer is movably connected relative to the second module layer and movable in a second direction. Additionally, a locking member is engageable with the third module layer to prevent movement in the second direction during movement of the first module layer in the first direction. The locking member may also be engageable with the first module layer to prevent movement in the first direction during movement of the third module layer in the second direction.

37 Claims, 5 Drawing Sheets

DEVICES AND METHODS FOR CONTROLLING RELATIVE MOVEMENT BETWEEN LAYERS OF AN ELECTRONIC DEVICE

CROSS-REFERENCE TO RELATED APPLICATIONS

This application is related to the following U.S. Patent Applications, each assigned to the present assignee and each hereby incorporated by reference:

application Ser. No. 10/718,125, entitled "A Portable Device With Versatile Keyboard," filed Nov. 19, 2003; and Application Ser. No. 10/945,577, filed concurrently herewith, on Sep. 20, 2004 and entitled "Devices And Methods For Controlling Relative Movement Between Layers Of An Electronic Device."

BACKGROUND

The disclosed embodiments relate to portable electronic devices, and more particularly, to devices and methods for controlling relative movement between layers of an electronic device.

Portable electronic devices such as mobile phones, pagers, handheld computers, personal digital assistants ("PDA's") and hand-held gaming devices are becoming increasingly popular for both business and personal use. One advantage of these devices is their portability due to their small size, light weight, battery-powered or cordless operation and, in some cases, their wireless communications ability. These features allow these portable electronic devices to be utilized whenever and wherever a user desires.

Because of the increasing popularity of these devices, however, it is not uncommon for a single user to carry with them more than one of these devices at one time. For example, a user may have a mobile phone and two-way pager strapped to their belt, while carrying a PDA in a pocket and a gaming device in their bag. As such, having separate devices perform each service or function creates a problem for a user who requires more than one or two services/functions offered by these portable devices.

Designers have realized this problem of device proliferation, and resultingly have tried to combine a number of services or functionalities into a single device. In this manner, a user may only require a single device having a number of operational modes that correspond to a number of the desired services or functions. One drawback of incorporating many operational modes into a single device, however, is that each service or function typically has an established configuration, including the overall shape and the number and specific types of components. For example, a mobile phone generally includes a phone keypad consisting of 12 keys: 1 key each for the numbers 0–9, and a separate key for the "*" and "#" characters. Further, a mobile phone is generally oriented for use with its length extending in a vertical axis such that its display unit is positioned above the keypad and such that the alphanumeric or graphical output of the display can be read by a user in this orientation. In contrast, a two-way pager typically includes an alphanumeric keyboard, such as a QWERTY keyboard that may include twice as many keys as a phone keypad. Further, a two-way pager typically has a display with a width greater than a length as viewed during use. In attempting to combine services/functionalities, a designer needs surface area onto which these established orientations and sets of components may be mounted. This increased demand for surface area competes with an overall goal of maintaining a device having a compact and portable size.

The copending patent application Ser. No. 10/718,125, entitled "A Portable Device With Versatile Keyboard," filed Nov. 19, 2003, addresses the problem of combining several configurations by creating a device having a number of functional layers. In such a device, each layer may have a first or neutral position in which it overlaps with the other layers to form a compact electronic device. Additionally, each layer may have a second position where a specific functionality associated with that layer is actuated, thereby creating additional operational modes.

One issue with such portable devices having multiple layers of functional components is that it may be possible to actuate more than one layer at one time. The resulting actuation of more than one operational mode may cause confusion for the user, and may create operational problems within the electronic device.

Thus, portable electronic devices having multiple layers of functional components are desired which provide for a discrete actuation between predetermined operational modes.

BRIEF SUMMARY

In accordance with one aspect, the disclosed embodiments provide a system and method for controlling relative movement between layers of an electronic device.

In one embodiment, an electronic device comprises a first module layer movable in a first direction, a second module layer movably connected relative to the first module layer, a third module layer movably connected relative to the second module layer and movable in a second direction, and a locking member engageable with the third module layer to prevent movement in the second direction during movement of the first module layer in the first direction.

In another embodiment, a portable electronic device comprises a first module layer movable in a first direction, a second module layer movably connected to the first module layer, a third module layer movably connected to the second module layer and movable in a second direction, a first means for permitting a first relative motion in the first direction between the first module layer and the second module layer, and a second means for permitting a second relative motion in the second direction between the second module layer and the third module layer while locking the first means to prevent the first relative sliding motion.

In yet another embodiment, a portable electronic device comprises a first component layer movable in a first direction and a second component layer having a first set of functional components. The second component layer is movably connected relative to the first component layer such that movement of the first component layer in the first direction exposes the first set of functional components and activates a first operational mode. The device further includes a third component layer having a second set of functional components, where the third component layer is movably connected to one of the first component layer and the second component layer. Further, the third component layer is movable in a second direction relative to the second component layer to expose a second set of functional components and activate a second operational mode. Additionally, the device includes a locking system having a first engagement position during the first operational mode and a second engagement position during the second operational mode. In the first engagement position the locking system engages the third component layer and is operable to prevent the second operational mode, and in the second engagement position the locking system engages the first component layer and is operable to prevent the first operational mode.

In still another embodiment, a communications device comprises a first module layer movable in a first direction, a second module layer movably connected to the first module layer, and a third module layer movably connected to the second module layer and movable in a second direction. The device further includes a first limiting structure defined in a first one of the first module layer, the second module layer and the third module layer, and a second limiting structure defined in a second one of the first module layer, the second module layer and the third module layer. Additionally, the device includes a locking member having a body connectable with a remaining one of the first module layer, the second module layer and the third module layer. The locking member is contactable with the first limiting structure to allow movement of the first module layer in the first direction and prevent movement of the third module layer in the second direction. Further, the locking member is contactable with the second limiting structure to allow movement of the third module layer in the second direction and prevent movement of the first module layer in the first direction. Additionally, the device includes a display for presenting information to a user, where the information has a first orientation when the first module layer moves in the first direction and a second orientation when the third module layer moves in the second direction.

In another embodiment, a method of controlling relative movement between movable layers of an electronic device comprises movably connecting a first module layer to a second module layer having a first functional component such that a relative movement of the first module layer in a first direction exposes the first functional component. The method also includes movably connecting the second module layer to a third module layer having a second functional component such that a relative movement of the third module layer in a second direction exposes the second functional component. Additionally, the method includes preventing movement of the third module layer in the second direction during movement of the first module layer in the first direction.

In an additional embodiment, a method for controlling actuation of operational modes of an electronic device comprises a step for exposing a first set of functional components on a second module layer movably connected to a first module layer, where the first set of functional components is associated with a first operational mode of the electronic device. The method also includes a step for exposing a second set of functional components on a third module layer movably connected to the second module layer, where the second set of functional components is associated with a second operational mode of the electronic device. Further, the method includes a step for preventing exposure of one of the first set of functional components and the second set of functional components during exposure of the other one of the first set of functional components and the second set of functional components.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The disclosed embodiments include devices and methods for controlling relative movement between layers of an electronic device.

Figures 1, 2, 3:
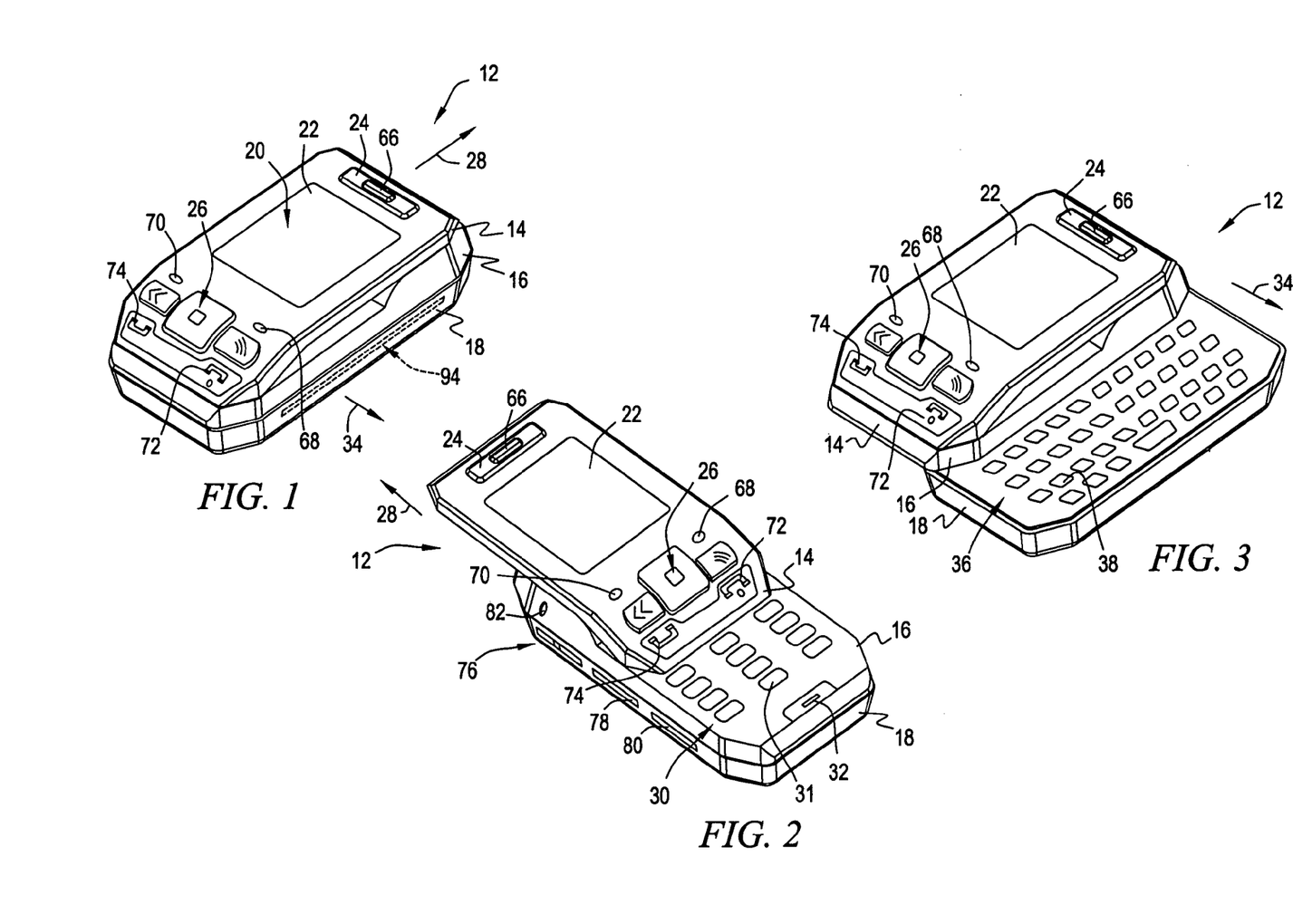
FIG. 1 is perspective view of one embodiment of an electronic device having a plurality of module layers in a first or neutral position which may correspond to a first operational mode.
FIG. 2 is a perspective view of the electronic device of FIG. 1 with the upper module layer moved in a first direction relative to the remaining module layers, thereby actuating a second operational mode.
FIG. 3 is a perspective view of the electronic device of FIG. 1 with the lower module layer moved in a second direction relative to the remaining module layers, thereby actuating a third operational mode.
Figure 7:
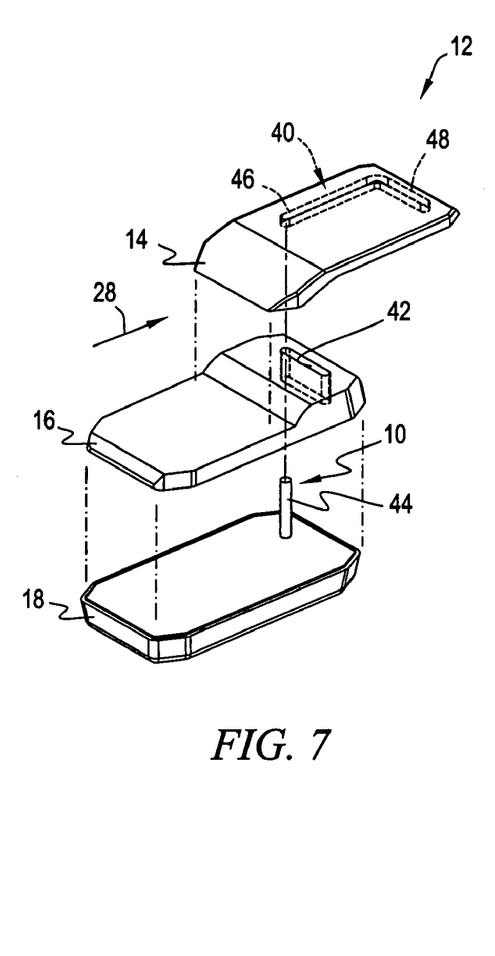
FIG. 7 is an exploded perspective view of the electronic device corresponding to FIG. 2, with some details removed, including the embodiment of the locking system for controlling relative movement between module layers.
Figure 8:
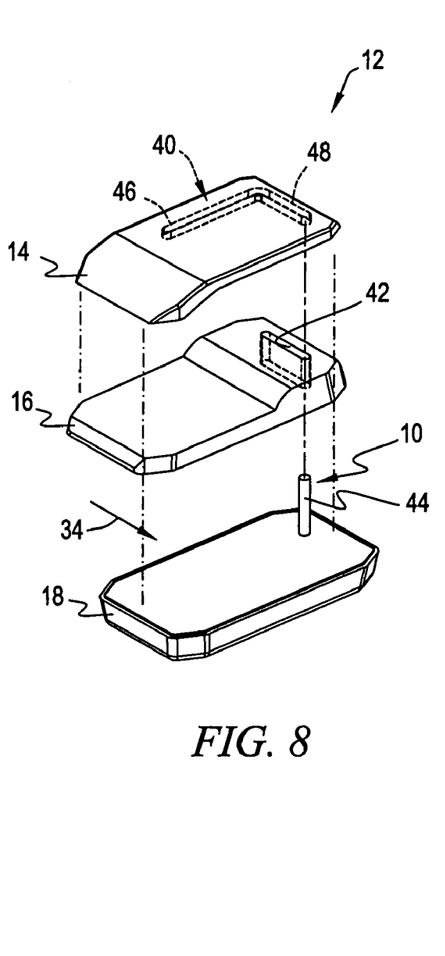
FIG. 8 is an exploded perspective view of the electronic device corresponding to FIG. 3, with some details removed, including the embodiment of the locking system for controlling relative movement between module layers.
Figure 9:
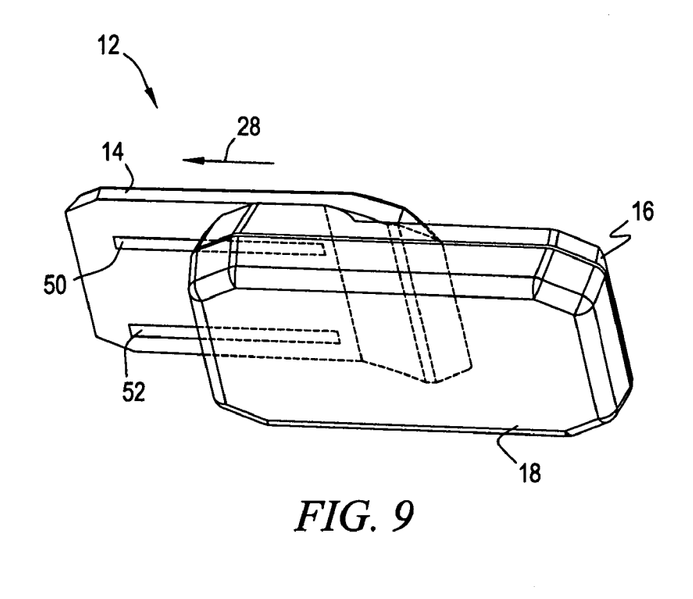
FIG. 9 is a perspective view of the electronic device, corresponding to FIG. 2, including one embodiment of the connection mechanism between the upper and middle module layers.
Figure 10:
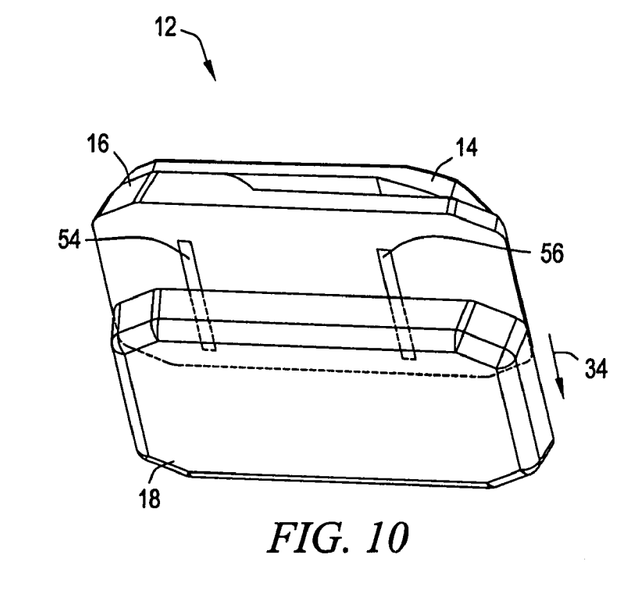
FIG. 10 is a perspective view of the electronic device, corresponding to FIG. 3, including one embodiment of the connection mechanism between the middle and lower module layers.

Referring to FIGS. 1–10, in one embodiment, a layer locking system 10 (FIGS. 4–8) controls relative movement of portions of electronic device 12, which has a number of movably interconnected module layers 14, 16, 18 that provide electronic device 12 with a number of functional capabilities. In one embodiment, for example referring to FIGS. 1 and 6, electronic device 12 may have a first operational mode, such as a gaming mode, when module layers 14, 16, 18 are positioned in a first or neutral position where a first set of components 20 such as a display unit 22 and directional keypads 24, 26 on the exterior of electronic device 12 may be utilized. Referring to FIGS. 2 and 7, electronic device 12 may have a second operational mode, such as a phone or audio communications mode, when first module layer 14 is moved in a first direction 28 relative to second and third module layers 16, 18 to expose a first additional set of components 30, such as a phone keypad 31 and microphone 32, on second module layer 16. Further, referring to FIGS. 3 and 8, electronic device 12 may have a third operational mode, such as a pager or text communications mode, when third module layer 18 is moved in a second direction 34 relative to first and second module layers 14, 16 to expose a second additional set of functional components 36, such as a QWERTY keyboard 38, on third module layer 18. Locking system 10 interacts with each module layer 14, 16, 18 to enable a discrete actuation of a single operational mode by limiting predetermined relative movements between module layers 14, 16, 18 during actuation. In other words, locking system 10 allows predetermined relative movement of module layers 14, 16, 18 in a direction associated with the selected operational mode while preventing relative movement in one or more predetermined other directions, thereby locking out the other operational modes. Thus, locking system 10 provides electronic device 12 with multiple, discrete operational modes while preventing problems associated with attempted actuation of more than one operational mode at a time.

Referring to FIGS. 4–8, locking system 10 may include at least one limiting member 40, 42, 44 associated with each module layer 14, 16, 18 that act in combination during actuation of a selected operational mode to allow certain relative movements while preventing other relative movements. In one embodiment, for example referring specifically to FIGS. 6–8, limiting member 44 may take the form of an elongated member, such as a pin or a rod of any cross section, which extends through limiting member 42, such as a uni-directional slot, in middle module layer 16 and into limiting member 40, such as a bi-directional slot, in upper module layer 14. In this embodiment, uni-directional slot 42 includes a side wall that extends through the entire thickness of middle module layer 16 to form a through-hole having a length in second direction 34. Bi-directional slot 40 includes a side wall and a top wall that define a channel in a bottom surface of upper module layer 14. Further, bi-directional slot 40 includes a first slot portion 46 having a length in first direction 28 in communication with a second slot portion 48 having a length in second direction 34. As such, first slot portion 46 allows upper module layer 14 to move in first direction 28 and actuate a second operational mode by permitting pin or rod 44 to move along its length (see FIG. 7). Also during actuation of the second operational mode, the side walls of first slot portion 46 lock out actuation of the third operational mode by substantially limiting or preventing movement of pin or rod 44 in second direction 34. In other words, in this embodiment, first slot portion 46 in combination with pin or rod 44 allows movement of upper module layer 14 relative to middle and/or lower module layers 16, 18 in first direction 28 while substantially limiting or preventing movement of lower module layer 18 relative to middle and/or upper module layers 16, 14 in second direction 34. Similarly, second slot portion 48 allows lower module layer 18 to move in second direction 34 and actuate the third operational mode by permitting pin or rod 44 to move along its length (see FIG. 8). Also during actuation of the third operational mode, the side walls of second slot portion 46 lock out actuation of the second operational mode by substantially limiting or preventing movement of pin or rod 44 in first direction 28. In other words, in this embodiment, second slot portion 48 in combination with pin or rod 44 allows movement of lower module layer 18 relative to middle and/or upper module layers 16, 14 in second direction 34 while substantially limiting or preventing movement of upper module layer 14 relative to middle and/or lower module layers 16, 18 in first direction 28. As utilized here, the term "substantially limiting" refers to minimizing relative movement in a given direction such that an operational mode associated with the relative movement in the given direction is not actuated.

Suitable materials for forming limiting members 40, 42, 44 include metals, plastics, composites, ceramics, and combinations thereof. Limiting members 40, 42, 44 may be formed integrally with a respective module layer 14, 16, 18 or formed separately and attached. Limiting members 40, 42, 44 may be attached via mechanical methods such as via screws, nails, rivets, swaging, sonic welding, etc, as well as chemical methods such as bonding.

Figure 11:
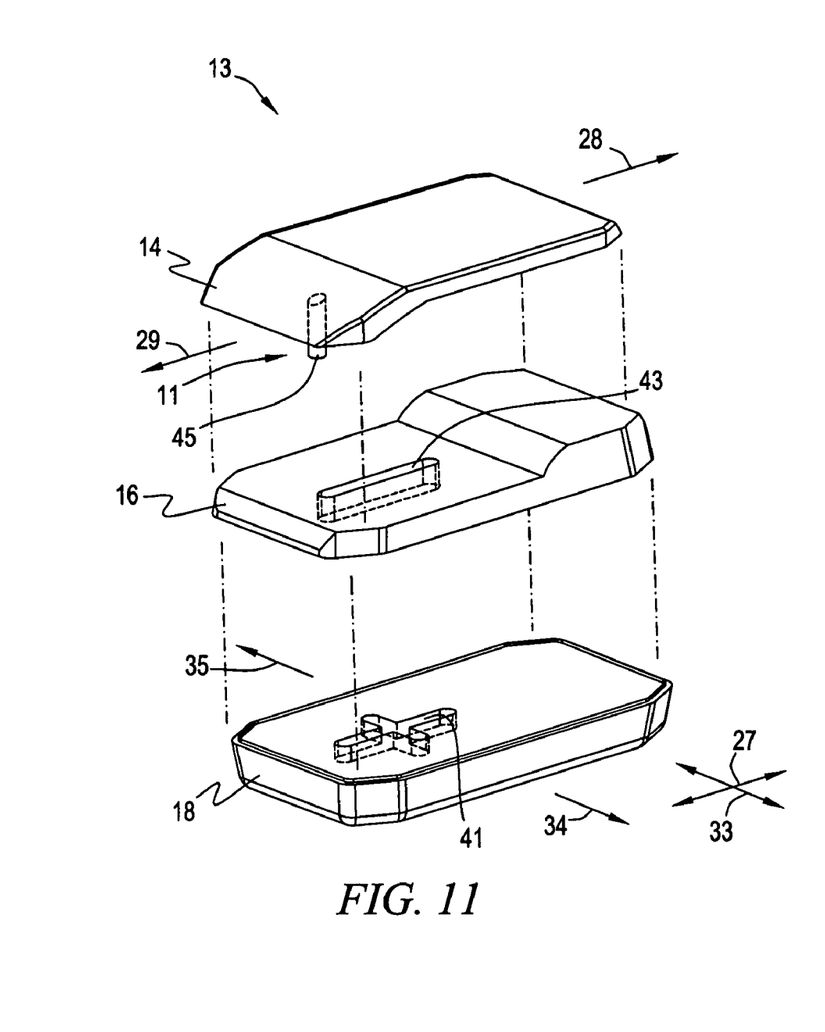
FIG. 11 is an exploded perspective view of another electronic device including another locking system for controlling relative movement between module layers.

Limiting members 40, 42, 44 may be associated with, and arranged on, each respective module layer 14, 16, 18 in any combination and in any position or configuration that allows actuation of the various operational modes of electronic device 12. For instance, alternate embodiments may include a pin/rod connected to upper module layer 14, while a bi-directional slot is formed in lower module layer 18. Further, the relative position of each limiting member 40, 42, 44 on each module layer 14, 16, 18 may be varied. For instance, a rod/pin may be placed in anywhere on a module layer surface with a corresponding shift in position of uni- and bi-directional slots on the respective layers. Further, the slots may have different lengths depending on the amount of surface area on each layer desired to be exposed by the various relative movements. Still further, the bi-directional slot may not only have an L-shape, as discussed above, but may also include a "+" shape that allows movement in two different directions along the same axis, thereby achieving additional operational modes. For example, referring to FIG. 11, one embodiment of an electronic device 13 includes a locking system 11 having a pin/rod 45 extending from upper module layer 14 through a uni-directional slot 43 in middle module layer 16 and into a bi-directional slot 41 in lower module layer 18. Bi-directional slot 43 allows first module layer 14 to move in first direction 28 and an opposite direction 29 parallel to axis 27 to actuate two different operational modes while preventing actuation of operational modes associated with relative movement of lower module layer in at least second direction 34. Further, bi-directional slot 43 allows third module layer 18 to move in second direction 34 and an opposite direction 35 parallel to axis 33 to actuate two more operational modes while preventing actuation of the operational modes associated with the relative movement of upper module layer 14 in at least first direction 28. Additionally, in other embodiments, locking system 10 and/or limiting members 40, 42, 44 may include all or some portion of the locking system and limiting member structure disclosed in U.S. application Ser. No. 10/945,577, entitled "Devices And Methods For Controlling Relative Movement Between Layers Of An Electronic Device," filed Sep. 20, 2004, hereby incorporated by reference.

Referring to FIGS. 4, 5, 9 and 10, it should also be noted that connection mechanisms 50, 52, 54, 56 may additionally form a portion of, or may provide assistance to, locking system 10. One or more connection mechanisms 50, 52, 54, 56 may be utilized to movably connect the module layers 14, 16, 18 such that the various relative movements are achievable. For example, in one embodiment, connection mechanisms 50, 52 movably connect upper and middle module layers 14, 16 for relative movement in first direction 28, while connection mechanisms 54, 56 movably connect middle and lower module layers 16, 18 for relative movement in second direction 34. In this example, connection mechanisms 54, 56 may aid locking system 10 by preventing relative movement between middle and lower module layers 16, 18 in first direction 28 during relative movement of upper module layer 14 in that direction. As such, during movement of upper module layer 14 in first direction 28 to actuate the second operational mode (see FIG. 7), the side walls of uni-directional slot 42 may engage pin or rod 44 to substantially limit or prevent relative movement of middle and lower module layers 16, 18 in first direction 28 while connection mechanisms 54, 56 also may act to substantially limit or prevent relative movement of middle and lower module layers 16, 18 in first direction 28. As a result, there is a discrete actuation of the second operational mode which provides a user with positive haptic feedback. Whether or not both or one of the pin/slot and connection mechanisms act to engage middle and lower module layers 16, 18 and limit their relative movement in first direction 28 during actuation of the second operational mode depends on various factors, such as dimensional characteristics and tolerances. Further, it should be noted that connection mechanisms 54, 56 may not be required if pin or rod 44 is movably connected to upper module layer 14, thereby effectively providing a movable relationship between middle and lower module layers 16, 18 guided by limiting member 42. Alternatively, connection mechanisms 54, 56 may allow relative movement between middle and lower module layers 16, 18 in any direction as the aforementioned slot 42 and pin/rod 44 interaction serves to limit the relative movement of these two layers in first direction 28 during actuation of the second operational mode.

Similarly, connection mechanisms 50, 52 may aid locking system 10 by preventing relative movement between upper and middle module layers 14, 16 in second direction 34 during relative movement of bottom module layer 18 in that direction. As such, during movement of lower module layer 18 in second direction 34 to actuate the third operational mode (see FIG. 8), the side walls of uni-directional slot 42 and second slot portion 48 allow pin or rod 44 to move in second direction 34 while connection mechanisms 50, 52 substantially limit or prevent relative movement of upper and middle module layers 14, 16 in second direction 34. Again, the result is a discrete actuation of the third operational mode which provides a user with positive haptic feedback. Additionally, it should be noted that connection mechanisms 50, 52 may not be required at all, or may allow relative movement between upper and middle module layers 14, 16 in any direction as the aforementioned slot 40, 42 and pin or rod 44 interaction serves to limit the relative movement of these two layers.

Figure 4:
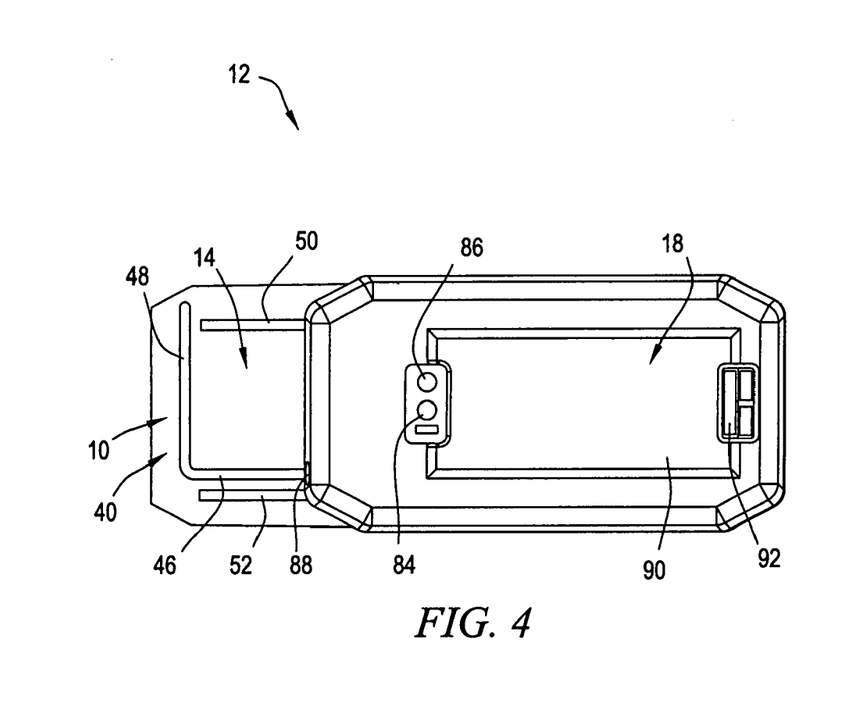
FIG. 4 is a rear view of the electronic device, corresponding to FIG. 2, and one embodiment of a portion of a locking system for controlling relative movement between module layers.
Figure 5:
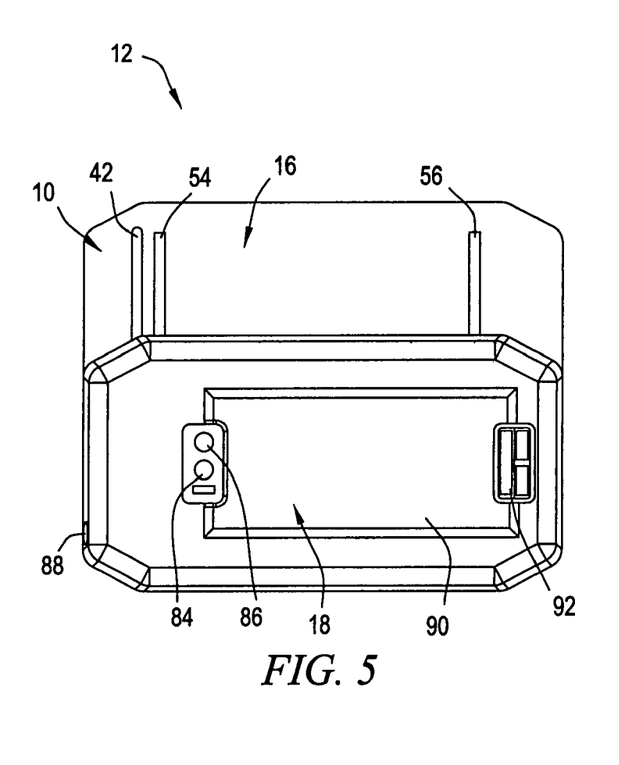
FIG. 5 is a rear view of the electronic device, corresponding to FIG. 3, and one embodiment of a portion of a locking system for controlling relative movement between module layers.
Figure 6:
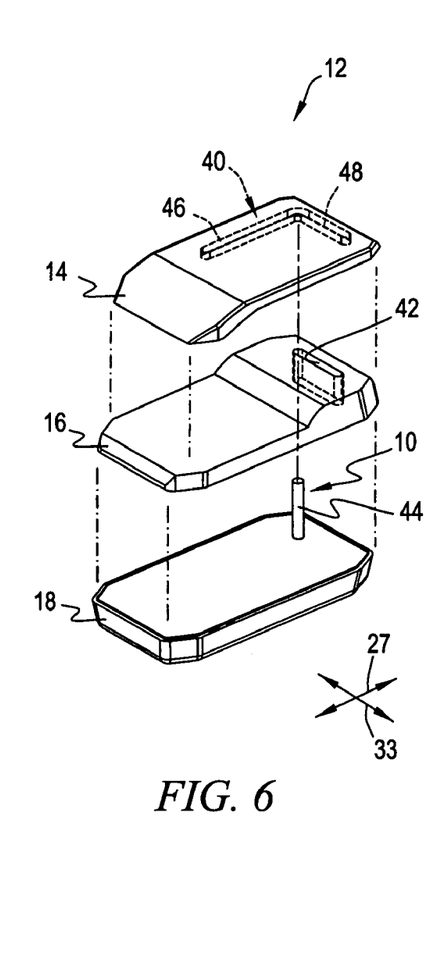
FIG. 6 is an exploded perspective view of the electronic device of FIG. 1, with some details removed, including one embodiment of the locking system for controlling relative movement between module layers.
Figure 12:
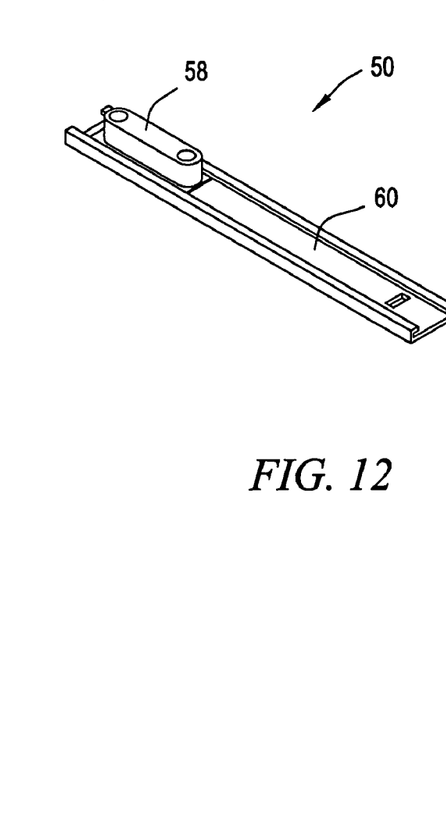
FIG. 12 is a perspective view of one embodiment of the connection mechanism of FIGS. 9 and 10.

Connection mechanisms 50, 52, 54, 56 may include various types of magnetic connectors and mechanical connectors. In one embodiment, referring to FIG. 12 for example, connection mechanisms 50 or 52 or 54 or 56 include a carrier body 58 movably connectable to a rail member 60 for movement along the length of the rail member. Carrier body 58 may be fixedly attached to one module layer 14, 16, 18, such as by mechanical or chemical fastening, while rail member 60 may be fixedly attached in a similar manner to the adjacent module layer to provide for the desired relative movement between layers. Referring to FIGS. 4, 5, 9 and 10, rail members associated with connection mechanisms 50, 52 have a length extending parallel to first direction 28, while rail members associated with connection mechanisms 54, 56 have a length extending parallel to second direction 34. As such, each carrier body 58 is movable in opposite directions along the length of each rail. Referring specifically to FIGS. 4 and 5, rail members 60 may be positioned parallel and/or perpendicular to limiting members 40, 42 depending in the particular module layer, the configuration of the limiting member and the desired direction of relative movement. As such, in this embodiment, the respective rail members and carrier bodies associated with connection mechanisms 50, 52, 54, 56 respectively provide the relative movement of upper and middle module layers 14, 16 to be substantially perpendicular to the relative movement of middle and lower module layers 16, 18. Although in this embodiment connection members 50, 52, 54, 56 are represented as bi-directional sliding connectors, it should be noted that these connection members may provide movement along more than one axis, in more than one plane, and the movement may include linear and/or rotary motion. Further, connection mechanisms 50, 52, 54, 56 may comprise metals, plastics, composites, and ceramics, and they may be formed integrally with each module layer 14, 16, 18 or separately attached via mechanical or chemical methods.

Although shown as including three layers, electronic device 12 may include any plurality of module layers that each may include one or more sets of functional components associated with one or more operational modes. The one or more operational modes enable device 12 to be utilized as one or more of: a mobile, satellite or wireless phone or audio communications device, a gaming device, a personal digital assistant ("PDA"), a pager or text communications device, a global positioning system ("GPS"), a remote control device for controlling another system, an audio player and/or recorder device such as an MP3 player or digital recorder, a static or dynamic video player and/or recorder device, a calculator device, etc. When utilized as a mobile phone, for example, device 12 may include hardware, software and/or firmware for sending and/or receiving communications-related signals using protocols such as a code division multiple access ("CDMA"), wide-band code division multiple access ("WCDMA"), global system for mobile communications ("GSM"), advance mobile phone service ("AMPS") and time division multiple access ("TDMA").

The one or more sets of components associated with each layer of device 12, such as module layers 14, 16, 18, may include one or more of plurality of types of functional components. These sets of components include external components, such as input and output type of mechanisms, and also internal components such as circuit boards and circuit elements such as transistors, chips, firmware, memory, software and processing units configured for one or more operational modes of device 12. For example, as mentioned above, first set of components 20 may include display 22, which includes any type of textual and/or graphical output (and/or input) unit such as an liquid crystal display, a light-emitting diode display, a touch screen, etc. Directional keypads 24, 26 include toggle keys, navigation keys and other individual or multiple function keys associated with controlling movement of a graphic on display 22 or associated with creating an input signal to device 12. First set of components 20 may also include other components such as: an audio speaker 66 (FIG. 1), such as a near-field and/or far-field speaker, for outputting audio signals; one or more indicator lights 68, 70 (FIG. 1) for signaling a status of the device 12; operational keys 72, 74 (FIG. 1) such as an on/off or hang-up key and a call accept/send key; volume keys 76 for increasing or decreasing a volume of a speaker such as near-field speaker 66; a push-to-talk button 78 (FIG. 2) for transmitting a voice signal in a walkie-talkie type phone mode; a record key 80 (FIG. 2) for activation a voice recorder functionality; a speaker/microphone input 82 (FIG. 2) for receiving a remote audio speaker and/or microphone connection mechanism; a camera mechanism 84 (FIGS. 4 and 5) for taking still or video pictures; a test port 86 (FIGS. 4 and 5) for connecting test or monitoring equipment, such as radio frequency ("RF") signaling equipment, to set-up, repair or test device 12; an infra red ("IR") transceiver 88 (FIGS. 4 and 5) for sending and/or receiving data via IR waves; a battery pack 90 (FIGS. 4 and 5) for providing a cordless power source to device 12; a power/data connector 92 (FIGS. 4 and 5) for establishing a hard-wired connection to a source of power to operate device 12 and/or recharge battery pack 90 and to transmit and/or receive data; and an antenna mechanism 94 (FIG. 1) for transmitting and/or receiving communications signals associated with one or more of the modes of device 12. Similarly, first and second set of additional components 30, 36 may include other functional components, such as any of the above-mentioned components, associated with a desired operational mode. It should be noted that the components associated with device 12 may be arranged in any combination, and on any layer, in order to achieve a desired configuration for each operational mode of device 12.

In operation, for example, the various operational modes of device 12 are controlled by the relative positioning of each layer of device 12. A method of controlling relative movement between these layers includes movably interconnecting various module layers to allow relative movement that exposes various functional components associated with each layer. Further, in order to provide a discrete actuation of an individual operational mode, the device further includes a locking mechanism that prevents movement between predetermined layers during actuation of predetermined modes.

In this embodiment, for example, referring back to FIGS. 1–5, the first operational mode of electronic device 12 may be activated by depressing one or a predetermined sequence of keys on the exterior of device 12. For example, the first operational mode may correspond to one or more of a gaming mode, a PDA mode, a camera mode, a GPS mode, a calculator mode, a data transfer mode and/or a phone stand-by mode. First set of components 20 may be utilized in various combinations to achieve the desired functionality of this mode. For instance, when operated as a gaming device in this first mode, device 12 may be held such that its width is its longest dimension, and directional keypads 24, 26 are utilized for controlling gaming functions. Additionally, associated with the actuation of this mode, device 12 may present the text and/or graphics output from display 22 in a predetermined orientation based on the selected operational mode. So, for example, the text/graphics in the gaming mode may be oriented 90 degrees relative to the text/graphics in a phone or PDA mode. Further, first set of components 20 may simultaneously be functioning in more than one mode, such as in a phone stand-by mode, where upon receiving a phone call an output may be generated, such as by one or more of display 22, indicator lights 68, 70 and speaker 66. A user may change device 12 into a phone mode by then sliding upper module layer 14 in first direction 28 or by accepting the call by depressing call accept key 74. In the PDA mode, a user may view data from display 22 and utilize any of the keys or buttons to produce inputs. Further, display 22 may be a touch screen display that allows additional inputs. In the camera mode, a user may operate camera 84 (FIGS. 4 and 5) to take a still picture or a video, which may also allow the user to record any audio signals received by microphone 32 (FIG. 2) and associated with the picture or video. Further, in the data transfer mode, data may be received by or sent from device 12 through one or more of test port 86 (FIGS. 4 and 5), IR transceiver 88 and power/data connector 92.

A user activates a second operational mode, such as the phone mode (FIG. 2), by moving upper module layer 14 in first direction 28 and exposing phone keypad 31. During this actuation step, locking system 10 (FIG. 7) prevents additional relative movement between the remaining layers that is associated with actuation of additional operational modes. In the phone mode, hardware, software and/or firmware within device 12 recognizes the actuation of this mode and orients the output of display 22 such that it is aligned for use in combination with phone keypad 31. Further, device 12 actuates predetermined internal circuitry associated with the functionality of this mode, such as communications hardware and software for sending and receiving wireless signals. A user may communicate by talking into microphone 32 and by listening to speaker 66. Further, additional phone-related functions may be performed via keystrokes on phone keypad 31 and send key 74, or by using directional keypad 24 or 26. This mode may be turned off, for example, by sliding upper module layer 14 back into the neutral position (FIG. 1) or by depressing the off key 72.

A user activates the pager or two-way text communications mode, referring to FIG. 3, by moving lower module layer 18 in second direction 34 and thereby exposing QWERTY keyboard 38. During this actuation step, locking system 10 (FIG. 8) prevents additional relative movement between the remaining layers that is associated with actuation of additional operational modes. In this mode, hardware, software and/or firmware within device 12 recognizes the actuation of this mode and orient the output of display 22 such that it is aligned for use in combination with QWERTY keyboard 38. Further, device 12 actuates predetermined internal circuitry associated with the functionality of this mode, such as communications hardware and software for sending and receiving wireless signals. A user may communicate, for example, by reading received text messages output by display 22 or by entering characters from keyboard 38 and sending to another device via send key 74. This mode may be turned off, for example, by sliding lower module layer 18 back into the neutral position or by depressing the off key 72.

Thus, the described embodiments provide devices and methods for controlling the actuation of an operational mode of device 12 by allowing certain relative movements between certain module layers while limiting other predetermined relative movements between other module layers. A locking system associated with each module layer is configured to control these various relative movements. While the various disclosed embodiments have been illustrated and described, it will be clear that the subject matter of this document is not limited to these embodiments only. Numerous modifications, changes, variations, substitutions and equivalents will be apparent to those skilled in the art without departing from the spirit and scope of the disclosed embodiments as described in the claims.

What is claimed is:

1. An electronic device, comprising:
   a first module layer movable in a first direction;
   a second module layer movably connected relative to the first module layer;
   a third module layer movably connected relative to the second module layer and movable in a second direction; and
   a locking member engageable with the third module layer to prevent movement in the second direction during movement of the first module layer in the first direction.

2. The device of claim 1, wherein the locking member is further engageable with the first module layer to prevent movement in the first direction during movement of the third module layer in the second direction.

3. The device of claim 2, further comprising a first limiting portion and a second limiting portion respectively defined in a separate one of tie first module layer, the second module layer and the third module layer, wherein the first limiting portion and the second limiting portion are contactable with the locking member to allow relative movement of the first module layer in the first direction while preventing relative movement of the third module layer in the second direction.

4. The device of claim 2, wherein the first module layer comprises a first set of functional components, the second module layer comprises a second set of functional components and the third module layer comprises a third set of functional components, and wherein the device comprises a first operational mode utilizing the first set of functional components, a second operational mode utilizing the second set of functional components and a third operational mode utilizing the third set of functional components, wherein each operational mode is actuated based on a predetermined relative position of the first module layer, the second module layer and the third module layer.

5. The device of claim 2, further comprising a first connector connecting the first module layer and the second module layer, wherein the first connector allows at least linear movement substantially parallel to the first direction.

6. The device of claim 2, wherein the first direction and the second direction are substantially perpendicular.

7. The device of claim 2, further comprising a communications module having an input and an output respectively for receiving and transmitting a wireless signal.

8. The device of claim 2, further comprising a display for presenting information to a user.

9. The device of claim 2, wherein the second module layer further comprises a first input mechanism exposable when the first module layer moves in the first direction relative to the second module layer, end wherein the third module layer further comprises a second input mechanism exposable when the third module layer moves in the second direction relative to the second module layer.

10. The device of claim 3, wherein the first limiting portion comprises a first wall having a first longitudinal axis extending in the first direction and the second limiting portion comprises a second wall having a second longitudinal axis extending in the second direction.

11. The device of claim 4, wherein the first operational mode, the second operational mode and the third operational mode are selected from the group consisting of an audio communication mode, a textual communication mode, a personal digital assistant mode and a gaming mode, a global positioning system ("GPS") mode, a remote control device mode, an audio player or recorder mode, a static or dynamic video player or recorder device, and a calculator mode.

12. The device of claim 5, further comprising a second connector connecting the second module layer and the third module layer, wherein the second connector allows linear movement substantially parallel to the second direction.

13. The device of claim 10, wherein one of the first wall or the second wall further comprises a third wall having a third longitudinal axis extending in one of the first direction or the second direction.

14. The device of claim 11, wherein the second set of functional components are exposable when the first module layer moves relative to the second module layer in the first direction and thereby defines the second operational mode.

15. The device of claim 11, wherein the third set of functional components are exposable when the third module layer moves relative to the second module layer in the second direction and thereby defines the third operational mode.

16. The device of claim 13, wherein at least one of the first wall, the second wall and the third wall defines a slot that forms an opening entirely through the corresponding one of the first module layer, the second module layer and the third module layer.

17. The device of claim 8, wherein the information has a first orientation when the first module layer is moved in the first direction relative to the second module layer and a second orientation when the third module layer is moved in the second direction relative to the second module layer.

18. The device of claim 9, further comprising a display for presenting information to a user, wherein the information has a first orientation when the first input mechanism is exposed and a second orientation when the second input mechanism is exposed.

19. The device of claim 18, further comprising a first limiting portion and a second limiting portion respectively defined in a separate one of the first module layer, the second module layer and the third module layer, wherein the first limiting portion and the second limiting portion are contactable with the looking member to allow relative movement of the first module layer in the first direction while preventing relative movement of the third module layer in the second direction.

20. A portable electronic device, comprising:
    a first module layer movable in a first direction;
    a second module layer movably connected to the first module layer;
    a third module layer movably connected to the second module layer and movable in a second direction;
    a first means for permitting a first relative motion in the first direction between the first module layer and the second module layer, and
    a second means for permitting a second relative motion in the second direction between the second module layer and the third module layer while locking the first means to prevent the first relative sliding motion.

21. The device of claim 20, wherein the first means further locks the second means during the first relative sliding motion to prevent the second relative sliding motion.

22. The device of claim 20, wherein the first means comprises a pin and a first slot, the pin connectable with a first selected one of the first module layer, the second module layer and the third module layer, and the first slot located on at least a second selected one of the first module layer, the second module layer and the third module layer, and wherein the second means comprises the pin and a second slot located on at least a third selected one of the first module layer, the second module layer and the third module layer.

23. The device of claim 20, further comprising a communications module having an input and an output respectively for receiving and transmitting a wireless signal.

24. The device of claim 21, wherein the first means further comprises a longitudinally extending body movably contactable with at least one first limiting wall, wherein the longitudinally extending body is connectable with a first selected one of the first module layer, the second module layer and the third module layer, and wherein the first limiting wall is located on at least a second selected one of the first module layer, the second module layer and the third module layer.

25. The device of claim 21, wherein the second module layer further comprises a first input mechanism exposable when the first module layer moves in the first direction relative to the second module layer, and wherein the third module layer further comprises a second input mechanism exposable when the third module layer moves in the second direction relative to the second module layer.

26. The device of claim 24, wherein the second means further comprises the longitudinally extending body movably contactable with at least one second limiting wall, wherein the second limiting wall is located on at least a last selected one of the first module layer, the second module layer and the third module layer.

27. The device of claim 25, further comprising a display for presenting information to a user, wherein the information has a first orientation when the first input mechanism is exposed and a second orientation when the second input mechanism is exposed.

28. A portable electronic device, comprising:
a first component layer movable in a first direction;
a second component layer having a first set of functional components, the second component layer movably connected relative to the first component layer such that movement of the first component layer in the first direction exposes the first set of functional components and activates a first operational mode;
a third component layer having a second set of functional components, the third component layer movably connected to one of the first component layer and the second component layer, the third component layer movable in a second direction relative to the second component layer to expose a second set of functional components and activate a second operational mode; and
a locking system having a first engagement position during the first operational mode and a second engagement position during the second operational mode, wherein in the first engagement position the locking system engages the third component layer and is operable to prevent the second operational mode, and wherein in the second engagement position the locking system engages the first component layer and is operable to prevent the first operational mode.

29. The device of claim 28, wherein the locking system further comprises a first limiting member, a second limiting member and a third limiting member respectively positionable on separate ones of the first component layer, the second component layer and the third component layer such that, in the first engagement position, a first two of the limiting members are contactable with a first remaining one limiting member to prevent relative movement in the second direction and such that, in the second engagement position, a second two of the limiting members are contactable with a second remaining one limiting member to prevent relative movement in the first direction.

30. A communications device, comprising:
a first module layer movable in a first direction;
a second module layer movably connected to the first module layer;
a third module layer movably connected to the second module layer and movable in a second direction;
a first limiting structure defined in a first one of the first module layer, the second module layer and the third module layer;
a second limiting structure defined in a second one of the first module layer, the second module layer and the third module layer;
a looking member having a body connectable with a remaining one of the first module layer, the second module layer and the third module layer, wherein the locking member is contactable with the first limiting structure to allow movement of the first module layer in the first direction and prevent movement of the third module layer in the second direction, and wherein the locking member is contactable with the second limiting structure to allow movement of the third module layer in the second direction and prevent movement of the first module layer in the first direction; and
a display for presenting information to a user, wherein the information has a first orientation when the first module layer moves in the first direction and a second orientation when the third module layer moves in the second direction.

31. The method of claim 30, further comprising preventing movement of the first module layer in the first direction during movement of the third module layer in the second direction.

32. The method of claim 31, where preventing movement of the third module layer in the second direction during movement of the first module layer in the first direction further comprises movably contacting a longitudinally extending body with at least one first limiting wail, where the longitudinally extending body is connectable with a first selected one of the first module layer, the second module layer and the third module layer, and where the first limiting wall is located on at least a second selected one of the first module layer, the second module layer and the third module layer.

33. The method of claim 31, further comprising outputting information on a display in a first orientation when the first input mechanism is exposed and in a second orientation when the second input mechanism is exposed, where the display is located on one of the first module layer, the second module layer and the third module layer.

34. The method of claim 32, where preventing movement of the first module layer in the first direction during movement of the third module layer in the second direction further comprises movably contacting the longitudinally extending body with at least one second limiting wall, where the second limiting wall is located on at least a last selected one of the first module layer, the second module layer and the third module layer.

35. A method of controlling relative movement between movable layers of an electronic device, comprising:
movably connecting a first module layer to a second module layer having a first functional component such that a relative movement of the first module layer in a first direction exposes the first functional component;

movably connecting the second module layer to a third module layer having a second functional component such that a relative movement of the third module layer in a second direction exposes the second functional component; and preventing movement of the third module layer in the second direction during movement of the first module layer in the first direction.

36. A method for controlling actuation of operational modes of an electronic device, comprising:

a step for exposing a first set of functional components on a second module layer movably connected to a first module layer, where the first set of functional components is associated with a first operational mode of the electronic device;

a step for exposing a second set of functional components on a third module layer movably connected to the second module layer, where the second set of functional components is associated with a second operational mode of the electronic device; and a step for preventing exposure of one of the first set of functional components and the second set of functional components during exposure of the other one of the first set of functional components and the second set of functional components.

37. The method of claim 36, further comprising a step for displaying information in a predetermined orientation depending on an operational mode of the electronic device.

* * * * *